United States Patent [19]

Coberly et al.

[11] Patent Number: 5,788,864
[45] Date of Patent: Aug. 4, 1998

[54] AMINE HEAT STABLE SALT REMOVAL FROM TYPE II ANION EXCHANGE RESIN

[75] Inventors: Steven H. Coberly, Ft. Bend County; Thomas H. Laven; Arthur L. Cummings, both of Galveston County, all of Tex.

[73] Assignee: MPR Services, Charlotte, N.C.

[21] Appl. No.: 730,438

[22] Filed: Oct. 15, 1996

Related U.S. Application Data

[63] Continuation of Ser. No. 394,293, Feb. 24, 1995, abandoned.
[51] Int. Cl.$^6$ .................................................... C02F 1/42
[52] U.S. Cl. .......................... 210/670; 210/683; 210/678
[58] Field of Search ........................ 210/96.1, 138, 210/139, 140, 141, 142, 143, 664, 669, 670, 683, 739, 746, 662, 672, 678

[56] References Cited

U.S. PATENT DOCUMENTS

| | | | |
|---|---|---|---|
| 2,688,000 | 8/1954 | Kressman et al. | 210/669 |
| 2,797,188 | 6/1957 | Taylor et al. | 210/669 |
| 2,812,312 | 11/1957 | Wilkinson | 260/2.1 |
| 3,984,314 | 10/1976 | Fries | 210/669 |
| 4,122,149 | 10/1978 | Dunnery et al. | 423/242 |
| 4,170,628 | 10/1979 | Kosseim et al. | 423/243 |
| 4,469,602 | 9/1984 | Seal | 210/662 |
| 4,477,419 | 10/1984 | Pearce et al. | 423/228 |
| 4,795,565 | 1/1989 | Yan | 210/669 |
| 4,970,344 | 11/1990 | Keller | 210/669 |
| 4,999,113 | 3/1991 | Weber | 210/664 |
| 5,006,258 | 4/1991 | Veatch et al. | 210/677 |
| 5,045,291 | 9/1991 | Keller | 210/669 |
| 5,073,255 | 12/1991 | Chili et al. | 210/96.1 |
| 5,162,084 | 11/1992 | Cummings et al. | 210/662 |
| 5,234,601 | 8/1993 | Janke et al. | 210/662 |
| 5,273,070 | 12/1993 | Chili et al. | 210/190 |
| 5,277,822 | 1/1994 | Higgins | 210/675 |
| 5,544,072 | 8/1996 | Zimmerman et al. | 210/143 |

*Primary Examiner*—Cynthia L. Nessler
*Attorney, Agent, or Firm*—Bell Seltzer Intellectual Property Group of Alston & Bird LLP

[57] ABSTRACT

A process for removing thiocyanate and other anions from Type II strong base anion exchange resins with an alkali metal hydroxide is disclosed. The process is particularly beneficial to the regeneration and/or reclamation of alkanolamine solutions laden with heat stable salts, especially thiocyanate.

8 Claims, 1 Drawing Sheet

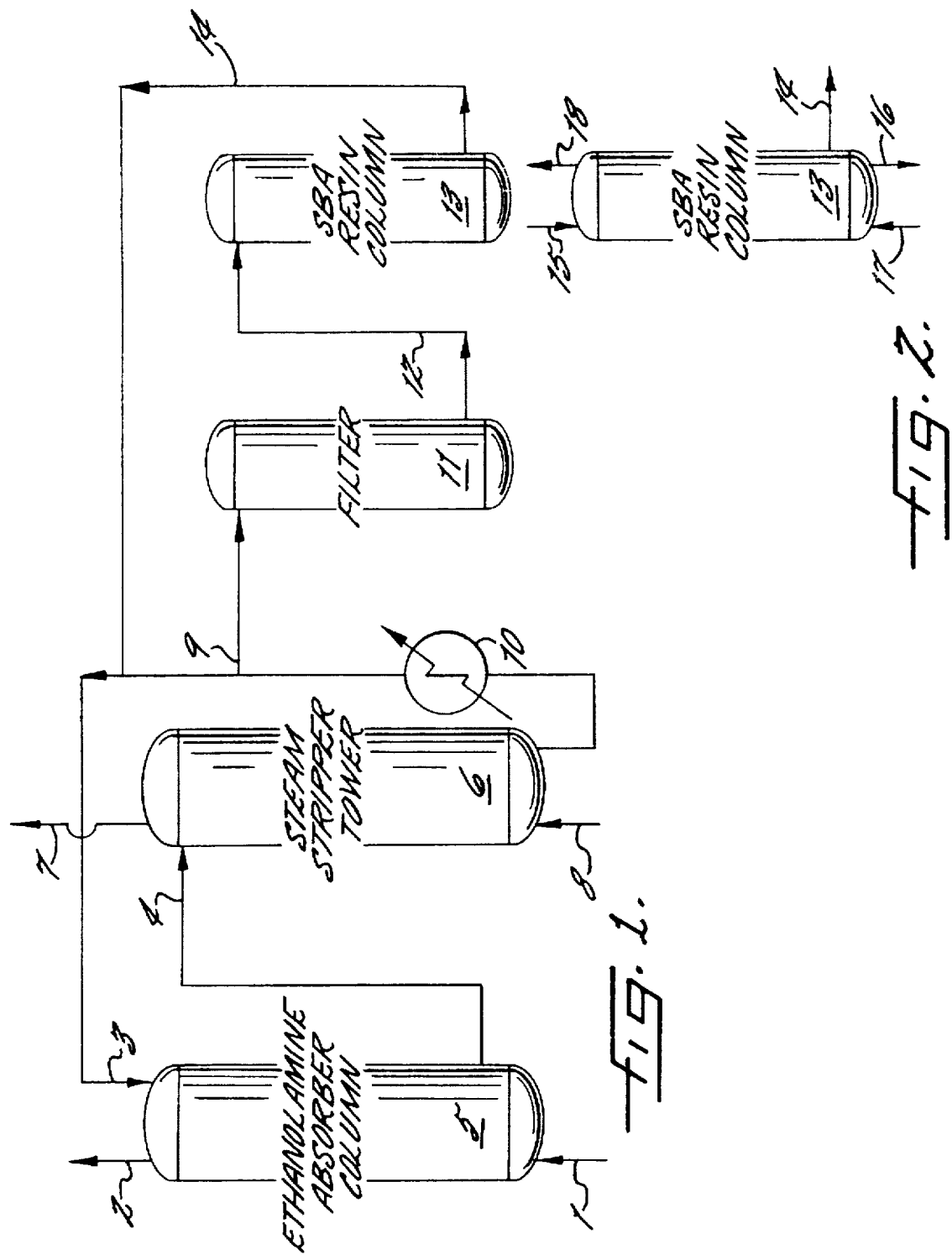

AMINE HEAT STABLE SALT REMOVAL FROM TYPE II ANION EXCHANGE RESIN

This application is a continuation of application Ser. No. 08/394,293, filed Feb. 24, 1995, now abandoned.

BACKGROUND OF THE INVENTION

(1) Field of the Invention

The present invention relates to processes for regenerating anion exchange resins. More specifically, the present invention relates to processes for regenerating Type II strong base anion exchange resins used to remove heat stable salts from ethanolamine gas purification process units by contacting the resin with a strong alkali.

(2) Description of the Prior Art

The removal of $H_2S$ and $CO_2$ from natural gases, enhanced oil recovery gases, refinery hydrodesulfurizer recycle gases, FCCU and Coker gas plant tail gases, LPG streams and Claus sulfur recovery tail gases is commonly accomplished by alkanolamine sweetening units. When aqueous solutions of alkanolamines are contacted in packed, sieve plate, bubble cap, or valve tray columns with streams containing $H_2S$ and $CO_2$, the $H_2S$ and $CO_2$ dissolve into the alkanolamine solution to form solvated alkanolamine salts (e.g., protonated alkanolamine cation with $HS^-$ and $HCO_3^-$ anions). The solution of water, unreacted alkanolamine, and alkanolamine salts is subjected to steam stripping to decompose the alkanolamine salts and remove $H_2S$ and $CO_2$ from the alkanolamine. The $H_2S$ and $CO_2$ are then further processed in well known operations. The alkanolamine solution is recirculated through contactor and stripper.

Unfortunately, alkanolamine salts are also formed with anions of other strong and weak acids that accumulate in the circulating solution. These may derive from gases, such as $SO_2$, COS, or HCN, which are present in the hydrocarbon gases through reactions in the alkanolamine solution. Thiocyanate anion ($SCN^-$), for example, forms from the reaction of HCN with $H_2S$ or sulfides in the gases from crude units or catalytic reformers. Other typical alkanolamine salt anions include $S_2O_3^=$, $SO_4^=$, $SO_4^=$, $HCO_2^-$, $CH_3CO_2^-$, and the like. These alkanolamine salts cannot be removed by steam stripping as $H_2S$ and $CO_2$ salts are. Thus, they are called heat stable salts and remain in the system where they accumulate in the alkanolamine solution, gradually depleting the effectiveness of alkanolamine treatment.

The alkanolamine salts of $H_2S$ and $CO_2$ are not heat stable and may readily be decomposed by steam stripping with the concomitant removal of the released $H_2S$ and $CO_2$ and deprotonation of the alkanolamine, freeing it for repeated reaction with acid gas in the contactor.

The depletion of alkanolamine solution effectiveness as heat stable salts build up results from protonated alkanolamine from the salt being unavailable to react with either $H_2S$ or $CO_2$ which dissolve into the solution. In addition, high concentrations of heat stable anions in the alkanolamine solution cause corrosion in the carbon steel equipment which is normally used in amine systems. The corrosion products are also known to contribute to foaming problems in the system which further decreases treating effectiveness and causes amine losses.

Special procedures have been developed to deal with the accumulation of alkanolamine heat stable salts. These include attrition, neutralization, and removal of heat stable salts. Attrition involves controlled and/or uncontrolled loss of the heat stable salt laden amine solution and replenishment with fresh (new; salt free) amine solution. The heat stable salts leaving the system approximately balance the incursion of new heat stable salts, and the system maintains an approximately constant concentration of heat stable salts. This requires continual wasting of alkanolamine, which can have deleterious effects on waste water treatment systems and the environment.

Neutralization is accomplished by adding a strong base, such as sodium hydroxide (NaOH), to the alkanolamine solute to deprotonate the alkanolamine, so that the alkanolamine can react with $H_2S$ and $CO_2$ in the gas stream. The deprotonated alkanolamine solution is then returned to $H_2S$ and $CO_2$ removal service. However, the sodium salts of the anions of the heat stable salts are also heat stable, are difficult to remove from the system, and thus accumulate in the alkanolamine solution with attendant corrosion and foaming problems.

Removal of heat stable salts connotes separation of the salts from the rest of the amine solution. Distillation, precipitation, and freezing are common physical methods of separation. Ion exchange can also be used to remove heat stable salts from alkanolamine solutions, and has been a subject in the patent literature for many years, for example, Taylor, U.S. Pat. No. 2,797,188, Pearce, U.S. Pat. No. 4,477,419, Keller, U.S. Pat. No. 4,970,344, Yan, U.S. Pat. No. 4,795,565, Veatch, U.S. Pat. No. 5,006,258, and Cummings, U.S. Pat. No. 5,162,084. Generally, heat stable salt anions are removed by exchange with hydroxide from an anion exchange resin and cations, such as sodium and potassium, are removed by exchange with hydrogen ion from a cation exchange resin. In the anion case, the protonated amine from the heat stable salt is deprotonated by reaction with hydroxide from the resin, resulting in water and free amine capable of reacting with acid gasses.

The various anions of heat stable salts have differing relative affinities for the anion exchange resin. Thiocyanate anion ($SCN^-$) is one of the common contaminants of alkanolamines that has a particularly strong affinity for strong base anion exchange resins. Thus, $SCN^-$ is easily removed from alkanolamine solutions, but is difficult to remove from the anion exchange resin. Regeneration of anion exchange resin laden with $SCN^-$ is much more difficult than regeneration of resin laden with other typical anions of heat stable salts. Taylor (U.S. Pat. No. 2,797,188 reported only 12% recovery of capacity of a thiocyanate-exhausted resin when regenerated by a typical one-step sodium hydroxide regeneration method.

Thus, multi-step regeneration processes using exchange resins have been tried. For example, in Taylor, U.S. Pat. No. 2,797,188, there is described a process for the removal of heat stable salts, including thiocyanate and formate, from an amine solution in a two-step process utilizing a strong base anion exchange resin. The particular difficulty of removing $SCN^-$ from the resin was noted and a two-step regeneration process was described. The first step of the process preferentially removes thiocyanate anions and the second step loads hydroxide ion on the resin. The first step employs sodium sulfate not to exceed 0.5N ($\approx$3.5 wt %); the more dilute the better. Sulfate replaces the recoverable $SCN^-$ on the resin. The second step employs strong alkali (e.g., sodium hydroxide), 1 to 5N ($\approx$4 to 17 wt %), by which substantially all the sulfate on the resin is replaced by hydroxide. The multi-step process of Taylor is effective in removing heat stable anions from alkanolamine solutions but regeneration of the resins used in the removal process is only partially successful but is considerably greater than by a conventional one-step alkali regeneration process.

U.S. Pat. No. 5,162,084, to Cummings, describes monitoring another two-step regeneration process, whereby 90% of the SCN— laden capacity can be recovered from Type I strong base anion (SBA) resin. The first step employs concentrated sulfuric acid, which acidifies the SCN⁻ and replaces SCN⁻ on the resin with bisulfate. The second step employs strong alkali (e.g., sodium hydroxide ≈10 wt %), by which substantially all the bisulfate and sulfate on the resin is replaced by hydroxide. Type II strong base anion (SBA) resin was not recommended for this treatment because of lower capacity relative to Type I resin.

The prior art processes described above each require two-step regeneration. Thus, it would be desirable to provide a process in which a single exchange resin could be used for the removal of thiocyanate anions and other heat stable anions from alkanolamine solutions and which can be effectively regenerated for reuse.

It is, therefore, the general object of the present invention to provide a process for regenerating anion exchange resins having thiocyanate anions and other heat stable anions bonded thereto.

Another object of this invention is to provide a process for regenerating a strong anionic exchange resin of the quaternary ammonium type having thiocyanate anions bonded thereto.

SUMMARY OF THE INVENTION

In accordance with this invention, it has been found that in the removal of heat stable anions from alkanolamine solutions using Type II SBA resins, the regeneration of the resins can be carried out in a single-step process. Thiocyanate anions and other heat stable anions can be repeatedly removed from Type II SBA exchange resins by treatment with an alkali metal hydroxide solution. Type II SBA resins are much more responsive to this procedure than Type I resins. The procedure makes Type II resin the more economical choice for SCN⁻ service which opposes prior intelligence.

According to one aspect of this invention there is disclosed a process for purifying an alkanolamine solution containing thiocyanate anions and other anions which form heat stable salts with such alkanolamine solution by contacting the alkanolamine solution with a Type II strong base anion exchange resin to remove at least part of the thiocyanate and other heat stable anions from the solutions, thereafter regenerating the exchange resin by contacting the resin with an alkali metal hydroxide to remove heat stable anions therefrom.

BRIEF DESCRIPTION OF THE DRAWINGS

Other objects, features and advantages of the invention will be apparent from the following detailed description taken in connection with the drawings.

FIG. 1 is a schematic diagram of the present invention illustrating the routes of the various process streams during normal process unit operations; and FIG. 2 is a schematic diagram of the present invention illustrating the routes of the various process streams during regeneration of the anion exchange resins of the process of FIG. 1.

DETAILED DESCRIPTION OF THE PREFERRED EMBODIMENTS

The process of the present invention may be used to purify aqueous alkanolamine solutions which contains alkali metal salts of anions which form heat stable salts with alkanolamines and/or heat stable salts of such anions with alkanolamines by contacting the alkanolamine solution with a Type II strong base anion exchange resin and to regenerate the exchange resin by contacting the resin with an alkali metal hydroxide. The alkanolamines commonly used are ethanolamine, diethanolamine, methyldiethanolamine, diisopropanolamine, diglycolamine, triethanolamine, etc. Any alkali metal hydroxide may be used for this purpose such as potassium hydroxide or lithium hydroxide; however, for economic reasons, sodium hydroxide is preferred.

An example of one system in which the process of the present invention may be used is shown in FIG. 1, wherein the sour gas 1 containing $H_2S$ and $CO_2$ is passed upwardly through an ethanolamine absorber column 5, where the sour gas is countercurrently contacted with lean ethanolamine-water solution 3. The lean ethanolamine solution 3 absorbs the $H_2S$ and $CO_2$, thereby purifying, or "sweetening" the gas. The sweetened gas stream 2 exits the top of the ethanolamine absorber column 5. Upon absorption of $H_2S$ and $CO_2$, the lean ethanolamine solution 3 becomes a rich ethanolamine solution 4.

The rich ethanolamine solution 4 is charged to the top of a stripper tower 6 and is stripped with steam 8 at about 240° F. to remove the $H_2S$ and $CO_2$ from the top of the stripper at outlet 7. Upon steam stripping, the ethanolamine solution exits the bottom of steam stripper tower 6 becomes lean ethanolamine solution 3 is cooled in heat exchanger 10 and is returned to the absorber 5 to start another cycle of absorption and stripping.

The circulating ethanolamine solution becomes increasingly laden with heat stable salts (HSS). A portion of the contaminated ethanolamine solution is passed to a HSS removal loop where a side stream of lean HSS-laden ethanolamine from line 3 is passed through line 9, optionally through filter 11 to remove any solid suspension, and is introduced via line 12 to anion exchanger resin column 13 which contains a Type II strong base anion exchange resin having an affinity for thiocyanate anions and other heat stable anions. The effluent lean ethanolamine stream 14, substantially free of HSS, exits the bottom of resin column 13 and is, in the system shown, combined with lean ethanolamine stream 3 to become the lean ethanolamine feed stream for the ethanolamine absorber 5. It should be understood, of course, that the present invention is not limited to use with the system shown.

The fraction of the lean contaminated ethanolamine solution which should be passed through the HSS removal loop—e.g., through the Type II strong base anion exchange resin—depends on the extent of contamination, the desired cleaning speed, and the volume and flow requirements of the absorber/stripper loop. It can range between 0 and 100%. This HSS removal loop may be operated continuously, such as to balance incursion of HSS in the ethanolamine solution or it may be operated intermittently.

As will now be explained, the anion exchange resin must be regenerated periodically. As shown in FIG. 2, a preferred first step in regeneration, the flow of ethanolamine solution to Type II strong basic anionic resin column 13 is stopped. Water is introduced to the resin column 13 to flush the exchange resin of ethanolamine. The water may be introduced through line 15 and removed through line 16. The exchange resin is then contacted, preferably countercurrently, by introducing an alkali metal hydroxide, e.g., sodium hydroxide, to the resin column 13 through line 17 to replace anions on the exchange resin with hydroxide anions. As the sodium salts of the anions are formed, they are removed overhead from the resin column 13 through line 18.

The alkali metal hydroxide which is used to complete the regeneration process by removal of the thiocyanate anions and other heat stable anions from the Type II strong base anion exchange resin is preferably sodium hydroxide but other alkali metal hydroxides such as potassium hydroxide or lithium hydroxide may also be used. Here again, the alkali metal hydroxide may be used at room temperature; however, higher temperatures are preferred usually between about 40° F. and about 140° F., preferably between 70° F. and 120° F. The alkali metal hydroxide used in the regeneration process will usually have a metal hydroxide concentration (based on the total water and hydroxide present) of between about 1 and about 15 weight percent, preferably between 5 and 12 weight percent. Depending on the concentration of the alkali metal hydroxide and the amount of heat stable anion on the resin, the quantity of alkali metal hydroxide used in the regeneration will vary from about 1 to about 40 pounds NaOH equivalent per cubic foot of Type II strong base anion exchange resin, preferably from about 12 to about 35 pounds NaOH equivalent per cubic foot of resin. The time of contact for maximum efficiency of contact of the alkali metal hydroxide is in part dependent upon the temperature and will vary from 9 to 60 minutes.

The invention has been specifically described in its application to the use of ethanolamine, however, any of the other commonly used alkanolamines may be used in the process.

Examples of Type II strong base anion exchange resins include styrene-divinylbenzene resins with quaternary alkanolamine groups attached to the polymer framework, such as Resintech™ SBG-2, Sybron Ionac™ASB-2, Rohm and Haas' Amberlite™ IRA-410, and Dow styrene-divinylbenzene strong base anion exchange resins having quaternary amines as their functional group. The preceding anion exchange resins are merely illustrative of useful anion exchange resins and are not intended to limit the resin which may be used in carrying out the process of this invention.

The regeneration processes of this invention and their various aspects have been described in conjunction with a batch operation wherein the flow of alkanolamine solution is halted while anion exchange resin undergoes regeneration. The process may also be carried out continuously by providing a plurality of resin exchangers with appropriate piping and valves.

The process of this invention with a Type II strong basic anion exchange resin enables the user to obtain consistent recovery of over 50% of the virgin capacity of the resin with each cycle. The resulting absolute capacity (equivalent anion per volume of resin) is similar to or greater than some Type I resins used in the two-step acid/alkali regeneration processes of the prior art. The present process uses less regenerant chemical and has a shorter regeneration time for the same capacity per unit volume than Type I SBA resins, thereby making the present process more economical. Removing the heat stable anions reduces foaming losses, corrosion, and maximizes the active alkanolamine concentration.

The following examples are presented in illustration of the invention.

EXAMPLE 1

A 1.5 cm inside diameter plastic column was loaded with 12 mL of Type II strong base anion gel resin that had not previously been exposed to SCN⁻. The resin was put into the OH⁻ form by flowing 10% sodium hydroxide solution through the resin in an amount equal to 12 lbs. of NaOH per cubic foot of resin, which is a typical regeneration for that resin. A sample of the resin was titrated with hydrochloric acid (HCl) and found to contain 1.19 milliequivalents of OH⁻ per mL resin (1.19 meq/mL). This approximates the rated capacity of the virgin resin.

The resin was then subjected to 4 cycles, each including exhaustion with an excess of SCN and regeneration with 28 lbs of NaOH per cu. ft. resin. The exhaustion solution was 0.33 meq KSCN per gram aqueous solution and was flowed through the resin in about 15 minutes. The regeneration solution was 10 wt % NaOH in water and was flowed through the resin in about 60 minutes. After each regeneration, the resin was mixed well and a portion was titrated with HCl to determine the OH⁻ loading.

The results for each cycle are displayed in Table I.

TABLE I

| Type II SBA Gel Resin Capacity after Example 1 Cycles | | |
|---|---|---|
| Cycle | Resulting Capacity (OH⁻ loading) meq/mL | Relative to Virgin Capacity % |
| 0 | 1.19 | 100 |
| 1 | 0.612 | 51 |
| 2 | 0.559 | 47 |
| 3 | 0.556 | 47 |
| 4 | 0.589 | 49 |

The data shows that the regeneration capacity of about 50% which remained substantially constant with each regeneration.

EXAMPLE 2

A 1.5 cm inside diameter plastic column was loaded with 12 mL of Type II resin (SBG-2 from Resintech) that had been previously used to remove heat stable salts (but no significant levels of SCN⁻) from a refinery alkanolamine system. The resin was regenerated into the OH⁻ form by flowing 10% sodium hydroxide solution through the resin in an amount equal to 12 lb. of NaOH per cubic foot of resin, which is a typical regeneration for that resin.

The resin was then subjected to 5 cycles, each including exhaustion with an excess of SCN⁻ and regeneration with 28 lb of NaOH per cu. ft. resin. The exhaustion solution was 0.33 meq KSCN per gram 50% MDEA/water solution and was flowed through the resin in about 12 minutes. The regeneration solution was 10 wt % NaOH in water and was flowed through the resin in about 24 minutes. After the fifth regeneration, the resin was mixed well and a portion was titrated with HCl to determine the OH⁻ loading.

The results are shown in Table II.

TABLE II

| Type II SBA Gel Resin Capacity after Example 2 Cycles | | |
|---|---|---|
| Cycle | Resulting Capacity (OH⁻ loading) meq/mL | Relative to Virgin Capacity % |
| (virgin) | 1.19 | 100 |
| 5 | 0.628 | 53 |

Examples 1 and 2 show that Type II SBA resin can be used repeatedly to remove SCN⁻ from aqueous and aqueous alkanolamine solutions, and that about 50% of the virgin capacity can be repeatedly recovered with NaOH regeneration after exhaustion with SCN⁻. The regeneration can be accomplished in an unexpectedly brief period of time. The data also shows that about 50% of the virgin capacity is not recoverable by this method.

EXAMPLE 3

A 1.5 cm inside diameter plastic column was loaded with 12 mL of new Type I SBA resin (SBG1P from Resintech). The resin was put into the OH⁻ form by flowing 10% sodium hydroxide solution in an amount equal to 28 lb. NaOH per cubic foot of resin. A portion of the resin was titrated with HCl to determine OH⁻ loading.

The resin was then subjected to 5 cycles, each including exhaustion with an excess of SCN⁻ and regeneration with 28 lb. of NaOH per cubic foot of resin. The exhaustion solution was 0.33 meq KSCN per gram 50% MDEA/water solution and was flowed through the resin in about 12 minutes. The regeneration solution was 10 wt % NaOH in water and was flowed through the resin in about 24 minutes. After the fifth regeneration, a portion of the resin was titrated with HCl to determine OH⁻ loading.

The results are shown in Table III.

TABLE III

Type I SBA Gel Resin Capacity after Example 3 Cycles

| Cycle | Resulting Capacity (OH⁻ loading) meq/mL | Relative to Virgin Capacity % |
| --- | --- | --- |
| (virgin) | 1.00 | 100 |
| 5 | 0.17 | 17 |

Type I SBA resin loaded with SCN⁻ responds poorly to regeneration by NaOH.

EXAMPLE 4

Type II SBA (SBG2 from Resintech) was tested in the same apparatus as previous examples. The resin was put into the OH⁻ form by flowing 10% sodium hydroxide solution in an amount equal to 28 lb. NaOH per cubic foot of resin.

The resin was then subjected to 6 cycles, each including exhaustion with an excess of SCN⁻, and regeneration with 12 lb. of NaOH per cubic foot resin. The exhaustion solution was 0.33 meq KSCN per gram 50% MDEA/water solution and was flowed through the resin in about 12 minutes. The regeneration solution was 6 wt % NaOH in water and was flowed through the resin in about 30 minutes. After the sixth regeneration, a portion of the resin was titrated with HCl to determine OH⁻ loading.

The results are shown in Table IV.

TABLE IV

Type II SBA Gel Resin Capacity after Example 4 Cycles

| Cycle | Resulting Capacity (OH⁻ loading) meq/mL | Relative to Virgin Capacity % |
| --- | --- | --- |
| (virgin) | 1.19 | 100 |
| 3 | 0.60 | 50 |
| 6 | 0.65 | 55 |

EXAMPLE 5

Another Type II SBA resin (A300 from Purolite) was tested as in previous examples, but the regeneration solution (10 wt % NaOH in water, providing 12 lb. NaOH per cubic foot resin) was flowed through the resin in shorter times. After the third regeneration, a portion of the resin was titrated with HCl to determine OH⁻ loading.

The results are shown in Table V.

TABLE V

Type II SBA Gel Resin Capacity after Example 5 Cycles

| Cycle | Regeneration Time min | Resulting Capacity (OH⁻ loading) meq/mL | Relative to Virgin Capacity % |
| --- | --- | --- | --- |
| (virgin) |  | 0.83 | 100 |
| 1 | 17 |  |  |
| 2 | 17 |  |  |
| 3 | 8 | 0.41 | 49 |

EXAMPLE 6

A 1.5 cm inside diameter plastic column was loaded with 12 mL of new Type I SEA macroporous resin (SBMP1 from Resintech). The resin was put into the OH⁻ form by flowing 10% sodium hydroxide solution in an amount equal to 28 lb. NaOH per cubic foot of resin. A portion of the resin was titrated with HCl to determine OH⁻ loading.

The resin was then subjected to 5 cycles, each including exhaustion with an excess of SCN⁻, and 2-step regeneration with 90 lb. $H_2SO_4$ per cubic foot resin followed by 28 lb. of NaOH per cubic foot resin (as described in Cummings, U.S. Pat. No. 5,162,084). The exhaustion solution was 0.33 meq KSCN per gram 50% MDEA/water solution and was flowed through the resin in about 12 minutes. The regeneration solutions were 15% $H_2SO_4$ and 10 wt % NaOH in water and were flowed through the resin in 90 and 40 minutes, respectively. After the fifth regeneration, a portion of the resin was titrated with HCl to determine OH⁻ loading.

The results are shown in Table VI.

TABLE VI

Type I SBA Gel Resin Capacity after Example 6 Cycles

| Cycle | Resulting Capacity (OH⁻ loading) meq/mL | Relative to Virgin Capacity % |
| --- | --- | --- |
| (virgin) | 0.79 | 100 |
| 5 | 0.51 | 65 |

From the foregoing examples, the economical advantage of the present invention is apparent. The chemical consumption per pound mole ("pm") of anions (SCN⁻, etc.) is shown in Table VII, based on the final capacities in the examples.

TABLE VII

Chemical Efficiency Comparison

| Resin Type | Regeneration scheme | Resin Capacity meq/ML | Resin Capacity pm/cu. ft. | Chemical Consumption $H_2SO_4$ lb/pm | Chemical Consumption NaOH lb/pm |
| --- | --- | --- | --- | --- | --- |
| I | 2-step | 0.51 | 0.032 | 2812 | 875 |
| I | NaOH(28 lb) | 0.17 | 0.011 | 0 | 2545 |
| II | NaOH(28 lb) | 0.63 | 0.039 | 0 | 718 |
| II | NaOH(12 lb) | 0.65 | 0.040 | 0 | 300 |

The potential savings to be realized by use of the invention is even greater when one considers the neutralization of regeneration waste prior to disposal. For example, the 2-step regeneration of Type I resin consumes an additional 1420 lb. NaOH/pm to neutralize the acid, totaling 2295 lb NaOH/pm HSS. The other three schemes in Table VII require acid to neutralize the unreacted NaOH: 3068, 830 and 318 lb $H_2SO_4$ per pm HSS, respectively.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for regenerating a Type II strong base anion exchange resin comprising:

passing an alkanolamine solution, whose effectiveness at removing $H_2S$ and $CO_2$ from gas streams has been decreased by the accumulation of heat stable salts, through a bed of Type II strong base anion exchange resin until the active anion exchange sites of said Type II strong base anion exchange resin are loaded with heat stable salt anions; and contacting said loaded Type II resin with an amount of an alkali metal hydroxide and for a time sufficient to obtain recovery of over 50% of the virgin capacity of the loaded Type II resin.

2. The process according to claim 1 wherein said heat stable salt anion is $SCN^-$.

3. The process according to claim 1 wherein said alkali metal hydroxide is sodium hydroxide.

4. The process according to claim 3 wherein the amount of sodium hydroxide is from about 1 to about 40 pounds of NaOH equivalent per cubic foot of resin.

5. A process for regenerating a Type II strong base anion exchange resin comprising:

passing an alkanolamine solution, whose effectiveness at removing $H_2S$ and $CO_2$ from gas streams has been decreased by the accumulation of heat stable salts, through a bed of Type II strong base anion exchange resin until the active anion exchange sites of said Type II strong base anion exchange resin are loaded with heat stable salt anions;

contacting said loaded Type II resin with an amount of an alkali metal hydroxide and for a time sufficient to obtain recovery of over 50% of the virgin capacity of the loaded Type II resin; and repeating the steps of loading said Type II resin with said anions and regenerating repeatedly without substantial further reduction in active anion exchange sites.

6. The process according to claim 5 wherein said heat stable salt anion is $SCN^-$.

7. The process according to claim 5 wherein said alkali metal hydroxide is sodium hydroxide.

8. A process consisting of:

loading a Type II strong base anion exchange resin with $SCN^-$;

washing said Type II anion resin with water;

regenerating said Type II anion exchange resin in a single step with a solution of sodium hydroxide having a concentration of from about 1% to about 15% by weight of sodium hydroxide at a temperature of from about 70° F. to about 120° F. in an amount of NaOH from about 5 to about 35 pounds per cubic foot for from about 5 to about 120 minutes to remove heat stable anions from said resin to obtain recovery of over 50% of the virgin capacity of the loaded Type II resin; and washing said Type II anion exchange resin with water.

\* \* \* \* \*